(12) United States Patent
Hodowanec et al.

(10) Patent No.: US 7,458,262 B2
(45) Date of Patent: Dec. 2, 2008

(54) INTEGRAL CENTER PLANE BALANCING OF A ROTATING ELECTRIC DEVICE

(75) Inventors: Mark Hodowanec, Freehold, NJ (US); Rajendra V. Mistry, Cincinnati, OH (US)

(73) Assignee: Siemens Energy Automation, Inc., Alpharetta, GA (US)

( * ) Notice: Subject to any disclaimer, the term of this patent is extended or adjusted under 35 U.S.C. 154(b) by 0 days.

(21) Appl. No.: 11/924,909

(22) Filed: Oct. 26, 2007

(65) Prior Publication Data
US 2008/0041154 A1  Feb. 21, 2008

Related U.S. Application Data

(62) Division of application No. 10/895,549, filed on Jul. 21, 2004, now Pat. No. 7,343,663.

(60) Provisional application No. 60/488,880, filed on Jul. 21, 2003.

(51) Int. Cl.
G01M 1/16 (2006.01)

(52) U.S. Cl. .................. 73/460; 29/598; 73/462

(58) Field of Classification Search .............. 73/462, 73/460; 29/598; 74/572.21
See application file for complete search history.

(56) References Cited

U.S. PATENT DOCUMENTS

| | | | | |
|---|---|---|---|---|
| 3,869,228 A | * | 3/1975 | Swedberg | 418/132 |
| 5,638,606 A | * | 6/1997 | Bryan et al. | 34/59 |
| 5,800,331 A | * | 9/1998 | Song | 494/7 |
| 6,038,761 A | * | 3/2000 | Meiler et al. | 29/605 |
| 6,047,460 A | * | 4/2000 | Nagate et al. | 29/598 |
| 7,120,986 B2 | * | 10/2006 | Kojima et al. | 29/596 |
| 7,252,000 B2 | * | 8/2007 | Care et al. | 73/462 |
| 2002/0105243 A1 | | 8/2002 | Pfetzer | |
| 2004/0045154 A1 | * | 3/2004 | Kojima et al. | 29/598 |

FOREIGN PATENT DOCUMENTS

| | | |
|---|---|---|
| DE | 1183169 | 10/1964 |
| EP | 161326 | 11/1985 |
| EP | 726637 | 8/1996 |
| EP | 911537 | 4/1999 |
| JP | 57193954 | 11/1982 |

* cited by examiner

*Primary Examiner*—Hezron Williams
*Assistant Examiner*—Samir M Shah

(57) ABSTRACT

Certain exemplary embodiments provide a rotating machine assembly comprising a rotor machine assembly including a shaft, a plurality of laminations shrink fit around the circumference of the shaft, and weights affixed therebetween the laminations for balancing the rotating machine assembly.

3 Claims, 5 Drawing Sheets

INTEGRAL CENTER PLANE BALANCING OF A ROTATING ELECTRIC DEVICE

CROSS-REFERENCE TO RELATED APPLICATIONS

This application is a divisional of pending U.S. patent application Ser. No. 10/895,549 titled "Integral Center Plane Balancing of a Rotating Electric Device", filed 21 Jul. 2004, which claims priority to U.S. Provisional Patent Application No. 60/488,880, filed 21 Jul. 2003.

BACKGROUND

Rotating equipment, such as the rotors of an electric motor, are inherently unbalanced due to variations in material and manufacturing tolerances. Unbalanced operation accordingly results in vibration. The magnitude of vibration is related to the magnitude of unbalance, and increases as the rotating speed approaches the rotor's natural frequency (the rotor's critical speed). It will be appreciated that for flexible shaft rotors, critical speed is less than operating speed. One of ordinary skill in the art will understand that vibration undermines the performance of rotating equipment such as an electric motor. Further, continued episodes of vibration will limit the life of the rotating equipment and will result in higher maintenance costs. Therefore, there is need to minimize vibration in rotating devices such as electric motors.

For example, as a flexible shaft rotor transcends its critical speed, which occurs within its operating speed, the magnitude of vibration increases. The magnitude of vibration can be reduced by providing balancing of a third balancing plane, which in a rotating device such as an electric motor is located in close proximity to the rotor's geometric center. By providing a third plane for balancing, the counter balance weight can be distributed such that the force due to unbalanced weight can be reduced to a negligible amount throughout the entire speed range of a rotating device.

Conventional systems and methods for balancing a third plane of a rotating device require the removal of active material, such as electrical steel laminations at the center plane location. This in turn requires a longer rotor core to compensate for removal of active material. It will be appreciated that another disadvantage of conventional systems and methods for minimizing vibration of rotating devices is that the rotor must be entirely removed from the rotating device, such as a motor, for each balancing attempt. Accordingly, there is an unmet need to effectively and efficiently minimize vibration of a rotating device by balancing a third plane.

SUMMARY

The present invention achieves three plane balancing without removal of active material, (e.g., electrical steel laminations).

Certain exemplary embodiments of the present invention provide a rotating machine assembly comprising a rotor machine assembly including a shaft, a plurality of laminations shrink fit around the circumference of the shaft, and weights affixed therebetween the laminations.

Certain exemplary embodiments provide a rotating machine assembly comprising a rotor, a spider shaft within the rotor, a plane affixed to the spider shaft, and weights affixed to the plane for balancing the rotor.

Certain exemplary embodiments provide a rotating machine assembly comprising a rotor, a spider shaft positioned within the rotor, a longitudinal plurality of bars affixed and extending from the spider shaft at predetermined positions, a cross bar affixed between each pair of the longitudinal plurality of bars, and weights fastened to at least one of the cross bars to promote balancing of the rotating assembly.

BRIEF DESCRIPTION OF THE DRAWINGS

A wide variety of potential embodiments will be more readily understood through the following detailed description of certain exemplary embodiments with reference to the accompanying drawings in which.

DEFINITIONS

When the following terms are used herein, the accompanying definitions apply:

can—is capable of, in at least some embodiments.
comprising—including but not limited to.
critical speed—a speed at which mechanical resonance occurs.
electric motor—a motor powered by electricity. An electric motor can comprise two members, one stationary, called the stator, and the other rotating, called the rotor.
Either member can utilize one or more magnets: electromagnets, and/or ferromagnetic components.
elongated—having more length than width.
expected—predicted.
lamination—a layered material, can be comprised of steel or an alternative hardened material.
longitudinal—of or relating to longitude or length.
may—is allowed to, in at least some embodiments.
motor—something that converts electricity to linear and/or angular motion.
operating speed—a speed of operation, which is typically between a synchronous speed and a full-load speed.
pole—one of two or more regions in a magnetized body at which the magnetic flux density is concentrated.
predetermined—established in advance.
rigid—substantially inflexible.
rotor—a rotating part of a machine.
shaft—a long, generally cylindrical bar that rotates, and to which a rotor can be coupled.
shrink fit—heat is applied to expand a material so that upon cooling it tightly fits around an object.
speed—a linear or rotational velocity.
stator—a stationary part in or about which another part (the rotor) revolves.
substantially—to a great extent or degree.
system—a collection of mechanisms, devices, and/or instructions, the collection designed to perform one or more specific functions.

DETAILED DESCRIPTION

Certain exemplary embodiments provide a rotating machine assembly comprising a rotor machine assembly including a shaft, a plurality of laminations shrink fit around the circumference of the shaft, and weights affixed therebetween the laminations. Certain exemplary embodiments provide a rotating machine assembly comprising a rotor, a spider shaft within the rotor, a plane affixed to the spider shaft, and weights affixed to the plane for balancing the rotor. Certain exemplary embodiments provide a rotating machine assembly comprising a rotor, a spider shaft positioned within the rotor, a longitudinal plurality of bars affixed and extending from the spider shaft at predetermined positions, a cross bar affixed between each pair of the longitudinal plurality of bars, and weights fastened to at least one of the cross bars to promote balancing of the rotating assembly.

Figure 1A:
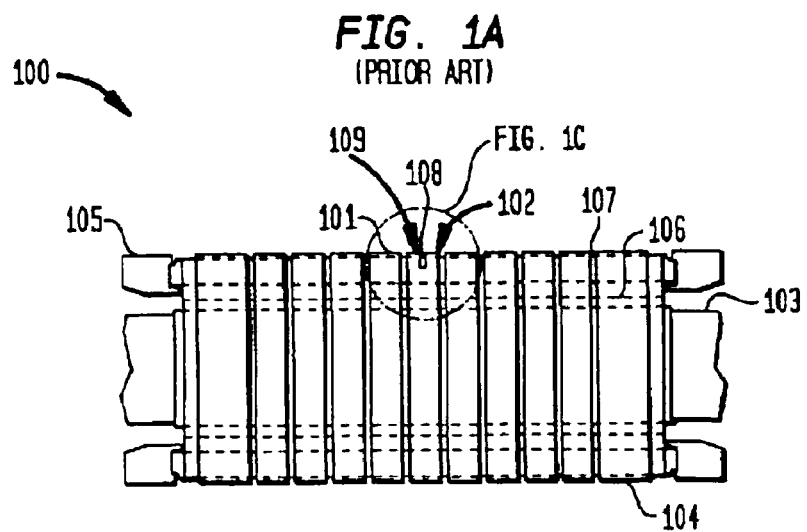
FIGS. 1A, 1B and 1C are prior art diagrams.
Figure 1B:
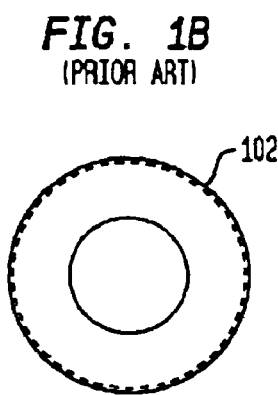
Figure 1C:
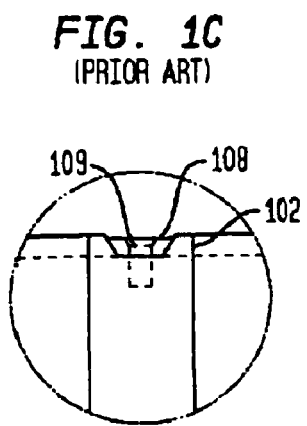

FIGS. 1A, 1B and 1C show an exemplary diagram of a prior art system for providing a third plane for three plane balancing. As shown, a rotor assembly 100 includes rotor laminations of electrical steel lamination material 101, a shaft 103, rotor bars 104 and end connectors 105 connected to copper bars 104. Rotor assembly 100 includes axial air vents 106 and radial air vents 107. A thick metal disc 102 is positioned and shrink fit around the circumference of shaft 103.

Thick metal disc 102 provides a center plane, which is also referred to as a third plane. Disc 102 is specially machined to receive balance weights 108. A balance weight 108 is fastened with fasteners 109 at each position, determined by a balancing procedure, to disc 102. Weights 108 are attached at positions as required by a previously performed balancing procedure that tests the rotor assembly and determines the angles, and thereby positions, in which each weight 108 is to be fastened to the exterior surface of disc 102.

It will be appreciated that use of a thick metal disc 102 of approximately 0.5-1.5 inches in thickness for use as a center plane to provide three plane balancing, requires removal of active electrical steel material from rotor laminations 101. Since the weights are fastened and extend from the surface of metal disc 102, it is necessary to remove active electrical steel material. One of ordinary skill in the art will understand that by removing active electrical steel material the efficiency and power provided by rotor assembly 100 is diminished. Accordingly, there is a need for a system and method for providing balancing of a rotor assembly system without negatively impacting operation of the rotating electric device performance (e.g., motor).

Figure 2A:
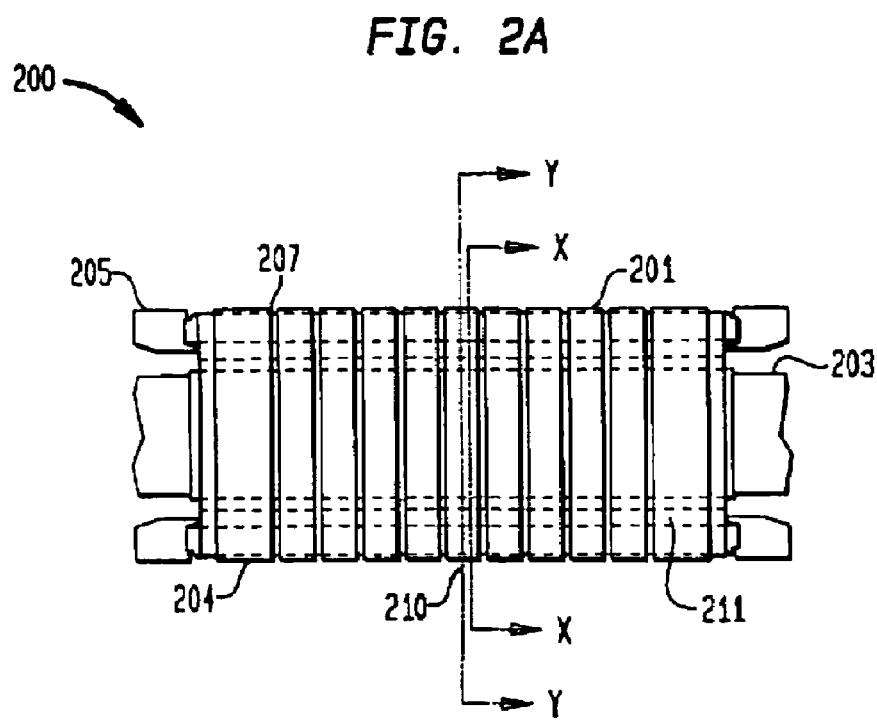
FIGS. 2A, 2B, 2C and 2D are diagrams of an exemplary embodiment of the present invention for creating a third plane for three plane balancing.
Figure 2B:
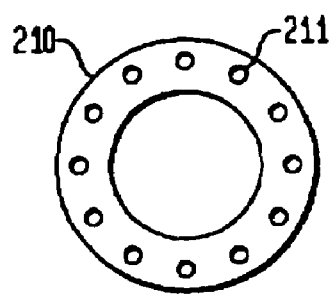
Figure 2C:
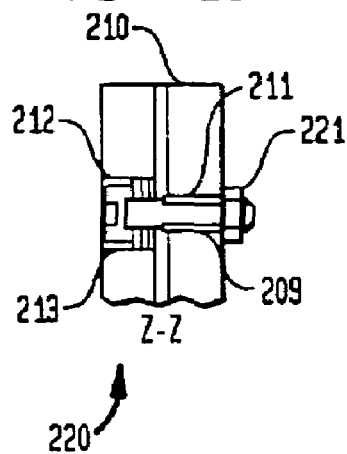
Figure 2D:
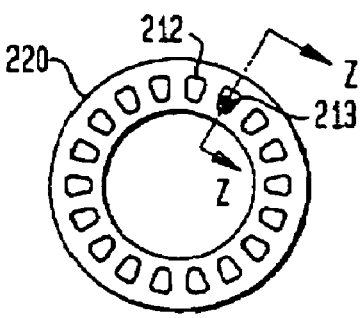

FIG. 2A is a side view of an exemplary embodiment of rotor assembly 200 of the present invention. It will be appreciated that rotor assembly 200 includes specially designed lamination 210 and lamination 220. FIG. 2B is a front view of axial vent holes 211 provided in laminations 210 in the near center packet laminations for passing through fasteners 209. FIG. 2D is a diagram showing trapezoidal air vents 112 provided in lamination 220 in the near center packet laminations and in spaced relation to laminations 210. FIG. 2C shows a cross-sectional view of laminations 210 and 220.

Balance weights 213 have the same trapezoidal shape as trapezoidal vents 212 and include a drilled aperture to receive fasteners 209 which are secured between lamination 210 and 220 during a balancing procedure. It will be appreciated that in certain embodiments fasteners 209 are metal bolts. An aperture of balancing weight 213 receives fastener 209 and fastener 209 is then passed through trapezoidal air vents 212. Fastener 209 passes through a circular aperture of lamination 210 and is secured by a fastening securement element 221. It will be appreciated that in certain embodiment the fastening securement element is a metal nut.

It will be appreciated that laminations are not removed in the present invention since laminations instead of a solid metal discs secure the balancing weights. As a result electrical steel material of the rotor assembly is not decreased, and therefore the present invention does not degrade the efficiency and power provided by the operation of the electric rotating device, such as a motor.

Figure 3A:
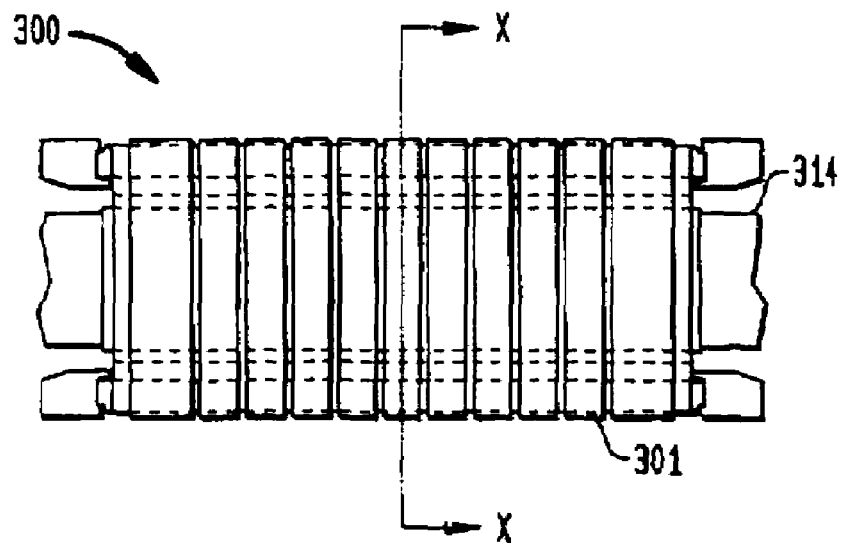
FIGS. 3A, 3B and 3C are diagrams of an exemplary embodiment of the present invention as applied to a milled spider shaft for creating a third plane for three plane balancing.
Figure 3B:
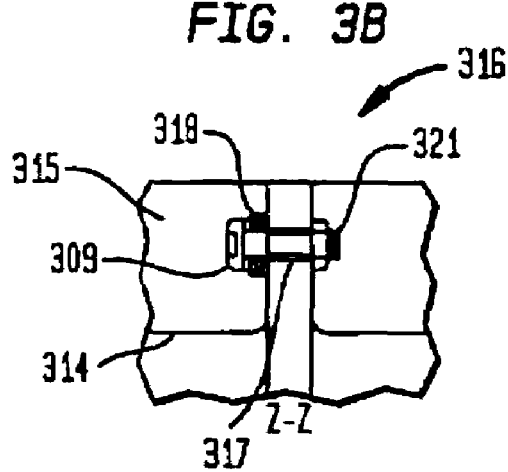
Figure 3C:
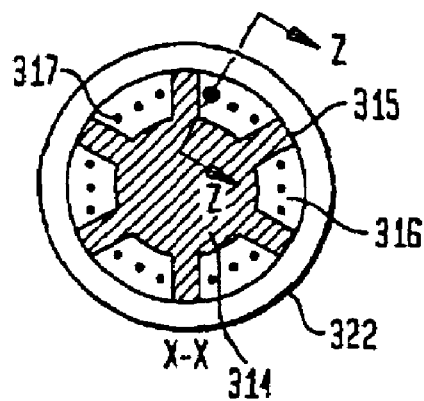

FIG. 3A is a diagram of an exemplary embodiment of the present invention for providing balancing weights to rotor assembly 300 that includes a spider shaft construction of a rotor. As shown in FIG. 3C, solid circular shaft 203 is milled to take the form of spider shaft 314. Spider shaft 314 is milled to include a pre-determined number of spiders 315 that project from its core. A disc shaped plane 316 is provided proximate to the geometrical center of spider shaft 314 and of a desired thickness. It will be appreciated that in certain embodiments the desired thickness (width) of the disc shaped plane is approximately 0.5-0.75 inches.

Plane 316 includes threaded apertures 317 to accept balance weights 318 provided during a balancing procedure. It will be appreciated that for each balancing weight 318, a fastener 309 is inserted through a drilled aperture of each weight and a threaded aperture 317 of plane 316. As shown in FIG. 3B, fastener 309 is secured by a fastening securement element 321, such as a bolt.

Figure 4A:
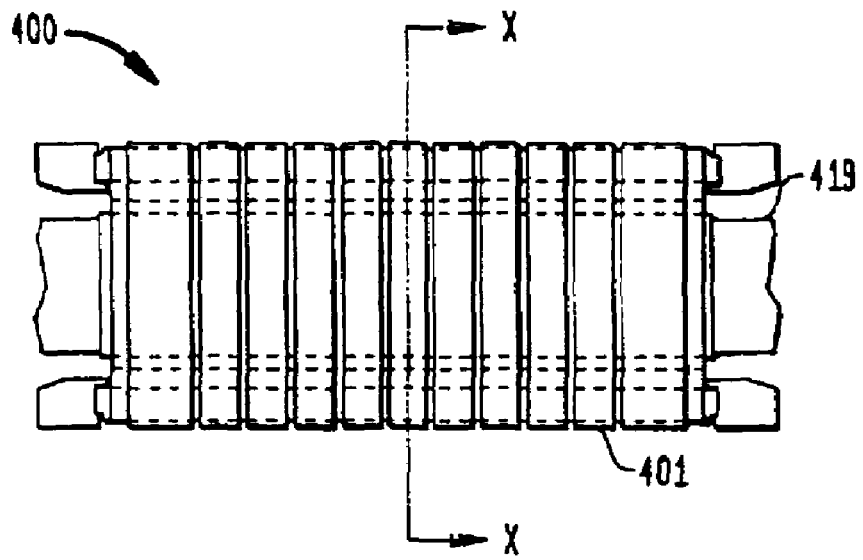
FIGS. 4A, 4B and 4C are diagrams of an exemplary embodiment of the present invention including a welded spider shaft for creating a third plane for three plane balancing.
Figure 4B:
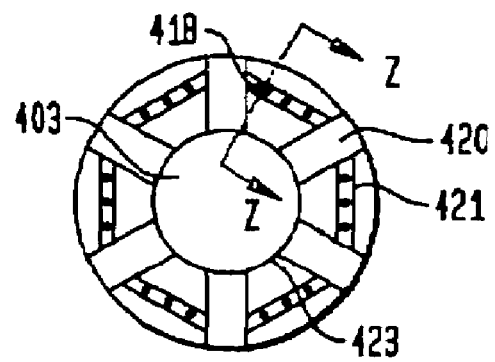

FIG. 4A is a diagram of another exemplary embodiment of the present invention as applied to a welded spider shaft 419. As shown in FIG. 4B, longitudinal rectangular bars 420 are welded at predetermined positions to circular shaft 423 to provide spider shaft 419. Approximate to the geometrical center of shaft 419 additional rectangular bars 421 are welded between longitudinal rectangular bars 420.

Figure 4C:
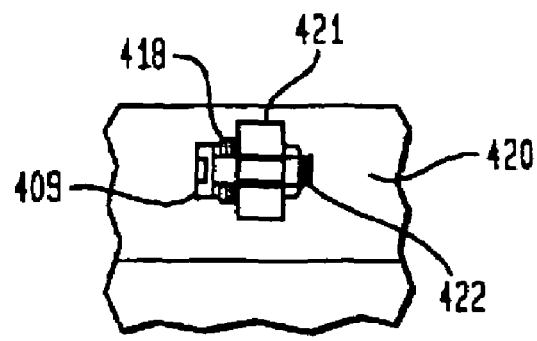

As shown in FIG. 4C, longitudinal rectangular bars 420 extending from circular shaft 423 include tapped apertures to accept balancing weights 418 as provided during the balancing procedure. It will be appreciated that for each balancing weight 418, a fastener 409 is inserted through an aperture of each weight and a tapped aperture of rectangular bars 421. Fastener 409 is secured by a fastening securement element 422, such as a bolt.

Figure 5:
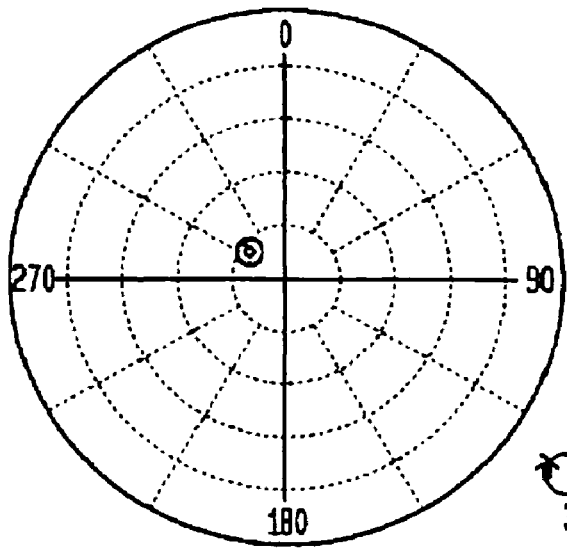
FIG. 5 is a report diagram output from a balance determination process.
Figure 5:
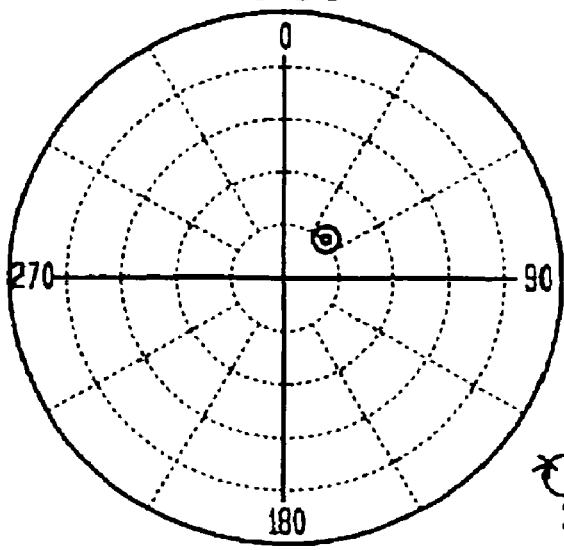

FIG. 5 is an exemplary embodiment of the conventional process of generated output that identifies the required weight and location for placement of weights for balancing a rotor assembly. FIG. 5 shows that on plane 1 a 17.6 gram weight is to be positioned at 306 degrees, while on plane 2 a 22.7 gram weight is to be placed at 46 degrees.

It should be appreciated that weights are only fastened to only a portion of the apertures of the laminations. However, one of ordinary skill in the art will understand that the closing of small apertures does not effect the operation of the rotor assembly.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render any claim seeking priority hereto invalid, then any such conflicting information in such incorporated by reference material is specifically not incorporated by reference herein.

What is claimed is:

1. A system for balancing a rotating device comprising:
 a rotor;
 a spider shaft provided within the rotor;
 a disc milled as a plane within an approximate geometric center of the spider shaft;
 a lamination shrink fit around the spider shaft and the disc; and
 a weight secured to the disc for balancing the rotating device.

2. The system of claim 1, wherein the disc includes an aperture for securing the weight.

3. The system of claim 1 further comprising a fastener for securing the weight through an aperture of the weight and an aperture of the disc.

* * * * *